(12) United States Patent
Nozaki et al.

(10) Patent No.: US 11,192,156 B2
(45) Date of Patent: Dec. 7, 2021

(54) COMPOSITE ROLL FOR ROLLING AND ITS PRODUCTION METHOD

(71) Applicant: HITACHI METALS, LTD., Tokyo (JP)

(72) Inventors: Yasunori Nozaki, Kitakyusyu (JP); Nozomu Oda, Kitakyusyu (JP); Toshiyuki Hattori, Kitakyusyu (JP)

(73) Assignee: HITACHI METALS, LTD., Tokyo (JP)

( * ) Notice: Subject to any disclaimer, the term of this patent is extended or adjusted under 35 U.S.C. 154(b) by 337 days.

(21) Appl. No.: 16/479,814

(22) PCT Filed: Feb. 8, 2018

(86) PCT No.: PCT/JP2018/004390
§ 371 (c)(1),
(2) Date: Jul. 22, 2019

(87) PCT Pub. No.: WO2018/147367
PCT Pub. Date: Aug. 16, 2018

(65) Prior Publication Data
US 2021/0237134 A1 Aug. 5, 2021

(30) Foreign Application Priority Data
Feb. 8, 2017 (JP) .............................. JP2017-021117

(51) Int. Cl.
*B21B 27/03* (2006.01)
*B22D 19/16* (2006.01)
(Continued)

(52) U.S. Cl.
CPC ............ *B21B 27/03* (2013.01); *B22D 11/008* (2013.01); *B22D 13/02* (2013.01); *B22D 19/16* (2013.01); *B32B 15/011* (2013.01)

(58) Field of Classification Search
CPC ....... B21B 27/03; B22D 11/008; B22D 13/02; B22D 19/16
See application file for complete search history.

(56) References Cited

U.S. PATENT DOCUMENTS

2016/0193637 A1 7/2016 Oda et al.
2016/0193638 A1 7/2016 Hattori et al.

FOREIGN PATENT DOCUMENTS

JP 60-124407 A 7/1985
JP 2002-88445 A 3/2002
(Continued)

OTHER PUBLICATIONS

Office Action dated Mar. 29, 2021 in Taiwanese Application No. 107104547.
(Continued)

*Primary Examiner* — Kevin P Kerns
*Assistant Examiner* — Steven S Ha
(74) *Attorney, Agent, or Firm* — Sughrue Mion, PLLC

(57) ABSTRACT

A composite roll for rolling comprising an outer layer and an inner layer integrally fused to each other; the outer layer being made of an Fe-based alloy comprising by mass 1-3% of C, 0.3-3% of Si, 0.1-3% of Mn, 0.1-5% of Ni, 1-7% of Cr, 1-8% of Mo, 4-7% of V, 0.005-0.15% of N, and 0.05-0.2% of B; the inner layer being made of graphite cast iron comprising by mass 2.4-3.6% of C, 1.5-3.5% of Si, 0.1-2% of Mn, 0.1-2% of Ni, less than 0.7% of Cr, less than 0.7% of Mo, 0.05-1% of V, and 0.01-0.1% of Mg; the inner layer comprising a core portion fused to the outer layer, and shaft portions integrally extending from both ends of the core portion; at least one of the shaft portions containing 200/cm² or more of hard MC carbides having circle-equivalent diameters of 5 μm or more.

8 Claims, 3 Drawing Sheets

(51) Int. Cl.
*B22D 11/00* (2006.01)
*B22D 13/02* (2006.01)
*B32B 15/01* (2006.01)

(56) References Cited

FOREIGN PATENT DOCUMENTS

| | | |
|---|---|---|
| JP | 2012-213780 A | 11/2012 |
| JP | 2015-062936 A | 4/2015 |
| WO | 2015/045720 A1 | 4/2015 |
| WO | 2015/045984 A1 | 4/2015 |

OTHER PUBLICATIONS

International Search Report for PCT/JP2018/004390 dated Mar. 27, 2018 [PCT/ISA/210].

US 11,192,156 B2

COMPOSITE ROLL FOR ROLLING AND ITS PRODUCTION METHOD

CROSS REFERENCE TO RELATED APPLICATIONS

This application is a National Stage of International Application No. PCT/JP2018/004390 filed Feb. 8, 2018, claiming priority based on Japanese Patent Application No. 2017-021117 filed Feb. 8, 2017.

FIELD OF THE INVENTION

The present invention relates to a composite roll for rolling in which an outer layer having excellent wear resistance and impact resistance is integrally fused to an inner layer having excellent toughness and wear resistance, and its production method.

BACKGROUND OF THE INVENTION

As a hot-rolling work roll, a centrifugally cast composite roll in which a centrifugally cast outer layer of a wear-resistant iron-based alloy is integrally fused to a tough inner layer of ductile cast iron is widely used. In a centrifugally cast composite roll, damage such as wear and surface roughening, etc. occurs on an outer layer of the roll due to thermal and mechanical load by contact with a rolled strip, deteriorating the surface quality of a rolled strip. Also, when a composite roll is used in rear stands of a hot-finishing mill, a strip moving between stands may be folded and bitten by upper and lower rolls, suffering so-called "cobble." In such cobble, the rolled strip may be stuck to an outer layer surface of the roll, causing cracking on the outer layer surface of the roll by an excessive thermal and mechanical load.

When the outer layer is damaged to some extent, the roll is exchanged. A roll taken out of the mill is reassembled in the mill, after damaged portions are removed by grinding from the outer layer. The removal of a damaged portion by grinding from an outer layer of a roll is called "damage-removing grinding." After a work roll is cut from its initial diameter to the minimum diameter usable for rolling (discard diameter) to remove damages, it is discarded. A diameter in a range from the initial diameter to the discard diameter is called "an effective rolling diameter." Frequent damage-removing grinding of an outer layer lowers productivity by the interruption of rolling, and reduces the effective rolling diameter. Accordingly, an outer layer in an effective rolling diameter range desirably has excellent wear resistance, impact resistance and surface roughening resistance to avoid large damages.

As shown in FIG. 1, a composite roll 10 comprises an outer layer 1 coming into contact with a strip to be rolled, and an inner layer 2 fused to an inner surface of the outer layer 1. The inner layer 2 is made of a material different from that of the outer layer 1, and constituted by a core portion 21 fused to the outer layer 1, and a drive-side shaft portion 22 and a free-side shaft portion 23 integrally extending from both ends of the core portion 21. An end portion of the drive-side shaft portion 22 is integrally provided with a clutch portion 24 for transmitting a driving torque. An end portion of the free-side shaft portion 23 is integrally provided with a projection 25 necessary for handling the composite roll 10. The clutch portion 24 has an end surface 24a, and a pair of flat notch surfaces 24b, 24b engageable with a driving means (not shown). The projection 25 has an end surface 25a.

The shaft portions 22, 23 are usually used without repair until discarding the roll after repeated damage-removing grinding of the outer layer 1. However, as the life of the outer layer 1 has been elongated in recent years, the shaft portions are likely damaged to such a level as making rolling difficult, resulting in premature discarding. Particularly a drive-side shaft portion 22 having a clutch portion 24 for transmitting a driving torque from a motor receives high stress by sliding with a coupling and a driving torque from the motor, so that it is highly likely damaged. Accordingly, it is a portion most requiring durability.

To solve the above problem of damage in shaft portions, the applicant proposed by WO 2015/045720 a centrifugally cast composite roll comprising a drive-side shaft portion having improved wear resistance while maintaining machinability of a free-side shaft portion. This centrifugally cast composite roll comprises a centrifugally cast outer layer and an inner layer of ductile cast iron integrally fused to the outer layer, the outer layer being made of an Fe-based alloy comprising by mass 1.3-3.7% of C, 0.3-3% of Si, 0.1-3% of Mn, 1-7% of Cr, 1-8% of Mo, at least one selected from the group consisting of 2.5-7% of V, 0.1-3% of Nb and 0.1-5% of W, V being an indispensable element, and 0.01-0.2% of B and/or 0.05-0.3% of S, the balance being substantially Fe and inevitable impurities, and having a structure free from graphite; and the inner layer comprising a core portion fused to the outer layer, and a drive-side shaft portion and a free-side shaft portion integrally extending from both ends of the core portion, the total amount of Cr, Mo, V, Nb and W being 0.35-2% by mass at an end of the drive-side shaft portion and 0.15-1.8% by mass at an end of the free-side shaft portion, the former being 0.2% or more by mass more than the latter.

Though the shaft portions have improved wear resistance in the centrifugally cast composite roll of WO 2015/045720, further improvement is desired to meet the recent requirement of providing shaft portions with longer life. To improve the wear resistance of ductile cast iron forming the inner layer, carbide-forming elements such as V, Nb, etc. are usually added to the ductile cast iron, to form hard carbides (MC carbides, etc.) different from cementite, but these carbide-forming elements hinder the graphitization of ductile cast iron, providing the ductile cast iron with smaller elongation. Accordingly, it is hard to provide a longer life to shaft portions.

OBJECT OF THE INVENTION

Accordingly, an object of the present invention is to provide a composite roll for rolling in which an outer layer having excellent wear resistance and impact resistance is integrally fused to an inner layer having excellent toughness and wear resistance, and its production method.

DISCLOSURE OF THE INVENTION

As a result of intensive research in view of the above object, the inventors have found that by transferring proper amounts of hard MC carbides from an outer layer into at least one of shaft portions of graphite cast iron, without adding carbide-forming elements such as V, etc., except for those coming from a raw material such as scraps, etc., to an inner layer melt, the shaft portions can be provided with extremely improved wear resistance without deteriorating toughness. The present invention has been completed based on such finding.

Thus, the rolling composite roll of the present invention comprises an outer layer and an inner layer integrally fused to each other;

the outer layer being made of an Fe-based alloy comprising by mass 1-3% of C, 0.3-3% of Si, 0.1-3% of Mn, 0.1-5% of Ni, 1-7% of Cr, 1-8% of Mo, 4-7% of V, 0.005-0.15% of N, and 0.05-0.2% of B, the balance being substantially Fe and inevitable impurities;

the inner layer being made of graphite cast iron comprising by mass 2.4-3.6% of C, 1.5-3.5% of Si, 0.1-2% of Mn, 0.1-2% of Ni, less than 0.7% of Cr, less than 0.7% of Mo, 0.05-1% of V, and 0.01-0.1% of Mg, the balance being substantially Fe and inevitable impurities; and the inner layer comprising a core portion fused to the outer layer, and shaft portions integrally extending from both ends of the core portion, at least one of the shaft portions containing 200/cm$^2$ or more of hard MC carbides having circle-equivalent diameters of 5 µm or more.

The outer layer preferably further contains 0.1-3% by mass of Nb, and the inner layer preferably further contains less than 0.5% by mass of Nb.

The outer layer preferably further contains 0.1-5% by mass of W, and the inner layer preferably further contains less than 0.7% by mass of W.

The outer layer may further contain 0.3% or less by mass of S.

The outer layer may further contain at least one selected from the group consisting of 0.1-10% of Co, 0.01-0.5% of Zr, 0.005-0.5% of Ti, and 0.001-0.5% of Al by mass.

The method of the present invention for producing a composite roll for rolling comprises (1) centrifugally casting the outer layer in a rotating, cylindrical centrifugal-casting mold; and then (2) pouring a melt for the inner layer at 1330-1400° C. into a cavity of the outer layer while the inner surface temperature of the outer layer is 950° C. or higher and lower than 1000° C., to remelt the inner surface of the outer layer to the depth of 10-30 mm.

The inner surface temperature of the outer layer is preferably 960-990° C. when the melt for the inner layer is poured.

The melt for the inner layer preferably has a composition comprising by mass 2.5-3.6% of C, 1.7-3.3% of Si, 0.1-1.5% of Mn, 0.1-2% of Ni, 0-0.5% of Cr, 0-0.5% of Mo, and 0.01-0.1% of Mg, the balance being substantially Fe and inevitable impurities.

EFFECT OF THE INVENTION

The present invention can provide a rolling composite roll comprising an outer layer having excellent wear resistance and impact resistance, and shaft portions having extremely improved wear resistance without deteriorating toughness, because graphitization-hindering carbide-forming elements such as V, etc. are not added to an inner layer melt, such that large amounts of hard MC carbides are contained in at least one of shaft portions of graphite cast iron. With the shaft portions having extremely improved wear resistance, the roll has long life, contributing to reducing a rolling cost.

DESCRIPTION OF THE PREFERRED EMBODIMENTS

Figure 1:
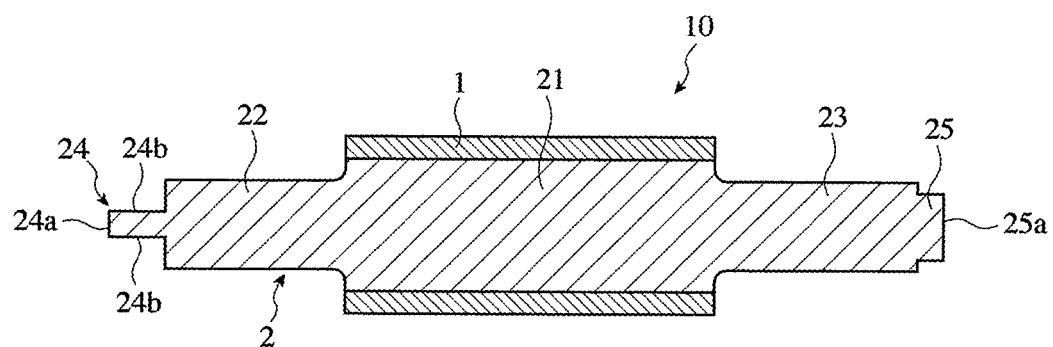
FIG. 1 is a schematic cross-sectional view showing a composite roll.
Figure 2:
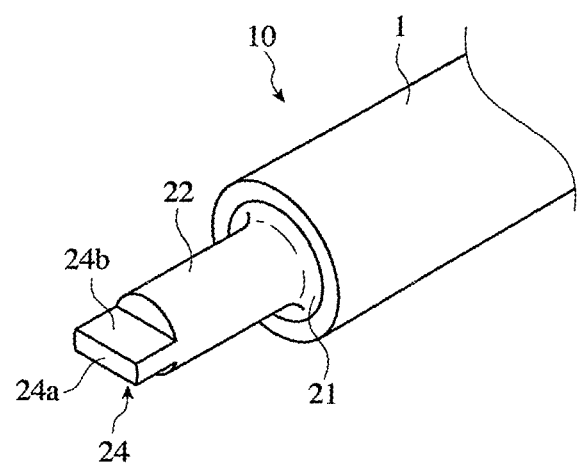
FIG. 2 is a partial perspective view showing a clutch side of the composite roll of FIG. 1.

The embodiments of the present invention will be explained in detail below without intention of restriction, and various modifications may be made within the scope of the present invention. Explanations of one embodiment may be applicable to other embodiments unless otherwise mentioned. What is described simply as "%" means "% by mass," unless otherwise mentioned.

[1] Composite Roll for Rolling (A) Outer Layer

The outer layer constituting the rolling composite roll of the present invention is made of an Fe-based alloy comprising by mass 1-3% of C, 0.3-3% of Si, 0.1-3% of Mn, 0.1-5% of Ni, 1-7% of Cr, 1-8% of Mo, 4-7% of V, 0.005-0.15% of N, and 0.05-0.2% of B, the balance being substantially Fe and inevitable impurities. The outer layer preferably further contains 0.1-3% by mass of Nb. The outer layer preferably further contains 0.1-5% by mass of W. The outer layer may contain 0.3% or less by mass of S. Further, the outer layer may contain at least one selected from the group consisting of 0.1-10% of Co, 0.01-0.5% of Zr, 0.005-0.5% of Ti, and 0.001-0.5% of Al by mass.

(1) Indispensable Elements (a) C: 1-3% by Mass

C is combined with V, Cr and Mo (and Nb and W if contained) to form hard carbides, contributing to improvement in the wear resistance of the outer layer. When C is less than 1% by mass, too small amounts of hard carbides are formed, failing to provide the outer layer with sufficient wear resistance. On the other hand, when C exceeds 3% by mass, excessive carbides are formed, providing the outer layer with lower toughness and decreased cracking resistance, thereby resulting in deep cracks by rolling, and thus large loss of the roll by damage-removing grinding. The lower limit of the C content is preferably 1.2% by mass, more preferably 1.5% by mass. Also, the upper limit of the C content is preferably 2.9% by mass, more preferably 2.8% by mass.

(b) Si: 0.3-3% by Mass

Si deoxidizes the melt to reduce defects by oxides, is dissolved in the matrix to improve sticking resistance, and further increases the fluidity of the melt to prevent casting defects. Less than 0.3% by mass of Si provides the melt with insufficient deoxidization and fluidity, resulting in a high percentage of defects. On the other hand, when Si exceeds 3% by mass, the alloy matrix becomes brittle, providing the outer layer with lower toughness. The lower limit of the Si content is preferably 0.4% by mass, more preferably 0.5% by mass. The upper limit of the Si content is preferably 2.7% by mass, more preferably 2.5% by mass.

(c) Mn: 0.1-3% by Mass

Mn has functions of not only deoxidizing the melt, but also fixing S as MnS. Because MnS exhibiting lubrication effectively prevents the sticking of a rolled strip, it is preferable to contain a desired amount of MnS. When Mn is less than 0.1% by mass, its effects are insufficient. On the other hand, more than 3% by mass of Mn does not provide further effects. The lower limit of the Mn content is preferably 0.3% by mass. The upper limit of the Mn content is preferably 2.4% by mass, more preferably 1.8% by mass.

(d) Ni: 0.1-5% by Mass

Because Ni has a function of improving the hardenability of the matrix of the outer layer, Ni can prevent the generation of pearlite during cooling when added to a large composite roll, improving the hardness of the outer layer. Less than 0.1% by mass of Ni exhibits substantially no effects, while more than 5% by mass of Ni stabilizes austenite too much, hardly improving the hardness. The lower limit of the Ni content is preferably 0.2% by mass, more preferably 0.3% by mass, further preferably 0.5% by mass. The upper limit of the Ni content is preferably 4% by mass, more preferably 3.5% by mass.

(e) Cr: 1-7% by Mass

Cr is an element effective for making the matrix bainite or martensite to keep hardness, thereby maintaining the wear resistance of the outer layer. Less than 1% by mass of Cr exhibits insufficient effects, while more than 7% by mass of Cr decreases the toughness of the matrix. The lower limit of the Cr content is preferably 1.5% by mass, more preferably 2.5% by mass. The upper limit of the Cr content is preferably 6.8% by mass.

(f) Mo: 1-8% by Mass

Mo is combined with C to form hard carbides ($M_6C$, $M_2C$), increasing the hardness of the outer layer, and increasing the hardenability of the matrix. Mo also forms tough and hard MC carbides together with V and/or Nb, improving the wear resistance. When Mo is less than 1% by mass, its effects are insufficient. On the other hand, more than 8% by mass of Mo lowers the toughness of the outer layer. The lower limit of the Mo content is preferably 1.5% by mass, more preferably 2.5% by mass. The upper limit of the Mo content is preferably 7.8% by mass, more preferably 7.6% by mass.

(g) V: 4-7% by Mass

V is an element combined with C to form hard MC carbides. The MC carbides are the hardest carbides having Vickers hardness HV of 2500-3000. Less than 4% by mass of V forms an insufficient amount of MC carbides, resulting in lack of the amount of MC carbides blended into the inner layer, thus providing insufficient effects of improving the damage resistance of a clutch portion. On the other hand, when V exceeds 7% by mass, MC carbides having a lower specific gravity than that of the iron melt are concentrated in an inner side of the outer layer by a centrifugal force during centrifugal casting, resulting in extreme radial segregation of MC carbides, which forms large MC carbides making the alloy structure coarser likely causing surface roughening during rolling. The lower limit of the V content is preferably 4.5% by mass, more preferably 5% by mass. The upper limit of the V content is preferably 6.9% by mass, more preferably 6.8% by mass.

(h) N: 0.005-0.15% by Mass

N is effective to make carbides finer, but it makes the outer layer brittle when it exceeds 0.15% by mass. The upper limit of the N content is preferably 0.1% by mass. To achieve a sufficient effect of making carbides finer, the lower limit of the N content is 0.005% by mass, preferably 0.01% by mass.

(i) B: 0.05-0.2% by Mass

B is not only dissolved in carbides, but also forms lubricating carboborides, improving the sticking resistance (impact resistance) of the outer layer. The lubrication of carboborides is remarkable particularly at high temperatures, effectively preventing the sticking of the outer layer when a hot-rolled strip is bitten. Less than 0.05% by mass of B does not exhibit sufficient lubrication. On the other hand, more than 0.2% by mass of B makes the outer layer brittle. The lower limit of the B content is preferably 0.06% by mass, more preferably 0.07% by mass. Also, the upper limit of the B content is preferably 0.15% by mass, more preferably 0.1% by mass.

(2) Optional Elements

The outer layer may further contain 0.1-3% by mass of Nb. The outer layer may also contain 0.1-5% by mass of W. The outer layer may further contain 0.3% or less by mass of S. The outer layer may further contain at least one selected from the group consisting of 0.1-10% of Co, 0.01-0.5% of Zr, 0.005-0.5% of Ti, and 0.001-0.5% of Al by mass.

(a) Nb: 0.1-3% by Mass

Like V, Nb is combined with C to form hard MC carbides. Nb added with V and Mo is dissolved in MC carbides to strengthen them, improving the wear resistance of the outer layer. Because Nb has a larger atomic weight than that of V, the specific gravity of V-based MC carbides, whose specific gravity is smaller than that of the iron melt, is increased when Nb is dissolved therein. Accordingly, Nb acts to reduce the segregation of MC carbides due to a centrifugal force during centrifugal casting. Less than 0.1% by mass of Nb has only small contribution to the formation of MC carbides, with substantially no effect of increasing the amount of MC carbides blended into the inner layer, so that it hardly increases the damage resistance of a clutch portion. On the other hand, when Nb exceeds 3% by mass, the amount of Nb-based MC carbides having larger specific gravity than that of the iron melt increases, likely causing their concentration and segregation on the surface side by a centrifugal force. The lower limit of the Nb content is preferably 0.2% by mass. The upper limit of the Nb content is preferably 2.9% by mass, more preferably 2.8% by mass.

(b) W: 0.1-5% by Mass

W is combined with C to form hard carbides such as $M_6C$, etc., to contribute to improving the wear resistance of the outer layer. W is also dissolved in MC carbides to increase their specific gravity, thereby reducing their segregation. However, W exceeding 5% by mass increases $M_6C$ carbides, resulting in an inhomogeneous structure, which causes surface roughening. Accordingly, W is 5% or less by mass if contained. On the other hand, less than 0.1% by mass of W provides insufficient effects. The upper limit of the W content is preferably 4% by mass, more preferably 3% by mass.

(c) S: 0.3% by Mass or Less

To utilize the lubrication of MnS, 0.3% or less by mass of S may be contained. However, more than 0.3% by mass of S makes the outer layer brittle. The upper limit of the S content is preferably 0.2% by mass, more preferably 0.15% by mass. When the lubrication of MnS is utilized, the lower limit of the S content is more preferably 0.05% by mass.

(d) Co: 0.1-10% by Mass

Co is dissolved in the matrix to increase the high-temperature hardness of the matrix, thereby improving the wear resistance and surface roughening resistance of the outer layer. Less than 0.1% by mass of Co provides substantially no effects, while more than 10% by mass of Co does not provide further improvement. The lower limit of the Co content is preferably 1% by mass, and the upper limit of the Co content is preferably 7% by mass.

(e) Zr: 0.01-0.5% by Mass

Like V and Nb, Zr is combined with C to form MC carbides, improving the wear resistance of the outer layer. Zr also forms oxide acting as crystallization nuclei in the melt, making the solidified structure finer. Further, Zr increases the specific gravity of MC carbides, preventing their segregation. However, Zr exceeding 0.5% by mass forms undesirable inclusions. The upper limit of the Zr content is more preferably 0.3% by mass. To obtain sufficient effects, the lower limit of the Zr content is more preferably 0.02% by mass.

(f) Ti: 0.005-0.5% by Mass

Ti is combined with C and N to form hard granular compounds such as TiC, TiN or TiCN. Acting as nuclei for MC carbides, they make the dispersion of MC carbides homogeneous, contributing to improvement in the wear resistance and surface roughening resistance of the outer layer. However, more than 0.5% by mass of Ti increases the viscosity of the melt, likely generating casting defects. The upper limit of the Ti content is more preferably 0.3% by mass, most preferably 0.2% by mass. To obtain sufficient effects, the lower limit of the Ti content is more preferably 0.01% by mass.

(g) Al: 0.001-0.5% by Mass

Al having high affinity for oxygen acts as a deoxidizer. Al is also combined with N and O to form oxynitrides, which are dispersed in the melt as nuclei, precipitating fine MC carbides uniformly. However, more than 0.5% by mass of Al makes the outer layer brittle, while less than 0.001% by mass of Al provides insufficient effects. The upper limit of the Al content is more preferably 0.3% by mass, most preferably 0.2% by mass. To obtain sufficient effects, the lower limit of the Al content is more preferably 0.01% by mass.

(3) Inevitable Impurities

The balance of the composition of the outer layer are substantially Fe and inevitable impurities. Among the inevitable impurities, P is preferably as little as possible because it deteriorates mechanical properties. Specifically, P is preferably 0.1% or less by mass. As other inevitable impurities, elements such as Cu, Sb, Te, Ce, etc. may be contained in ranges not deteriorating the properties of the outer layer. To secure excellent wear resistance and impact resistance of the outer layer, the total amount of inevitable impurities is preferably 0.7% or less by mass.

(4) Structure

The structure of the outer layer comprises (a) MC carbides, (b) Mo-based carbides (Mo carbides) of $M_2C$ or $M_6C$, or Cr-based carbides (Cr carbides) of $M_7C_3$ or $M_{23}C_6$, (c) carboborides, and (d) a matrix. The carboborides have a composition of $M(C, B)$, $M_{23}(C, B)_6$, etc., wherein a metal M is mainly at least one of Fe, Cr, Mo, V, Nb and W, with the proportions of the metal M, C and B varying depending on the composition. The structure of the outer layer of the present invention preferably does not contain graphite. The outer layer of the rolling composite roll of the present invention has excellent wear resistance because of hard MC carbides, Mo carbides or Cr carbides, and excellent impact resistance because of carboborides.

(B) Inner Layer

The inner layer of the rolling composite roll of the present invention is made of graphite cast iron comprising by mass 2.4-3.6% of C, 1.5-3.5% of Si, 0.1-2% of Mn, 0.1-2% of Ni, less than 0.7% of Cr, less than 0.7% of Mo, 0.05-1% of V, and 0.01-0.1% of Mg, the balance being substantially Fe and inevitable impurities.

(1) Indispensable Elements (a) C: 2.4-3.6% by Mass

C is dissolved in the matrix and crystallized as graphite. To crystallize graphite, the C content should be 2.4% or more by mass, though it deteriorates the mechanical properties of the inner layer when it exceeds 3.6% by mass. The lower limit of the C content is preferably 2.7% by mass, and the upper limit of the C content is preferably 3.5% by mass.

(b) Si: 1.5-3.5% by Mass

Si is an element necessary for crystallizing graphite. The Si content should be 1.5% or more by mass, though it deteriorates the mechanical properties of the inner layer when it exceeds 3.5% by mass. The lower limit of the Si content is preferably 1.7% by mass, and the upper limit of the Si content is preferably 3% by mass.

(c) Mn: 0.1-2% by Mass

Mn deoxidizes the melt, and is combined with S, an impurity, to form MnS, thereby preventing embrittlement by S. The Mn content should be 0.1% or more by mass, though it deteriorates the mechanical properties of the inner layer when it exceeds 2% by mass. The lower limit of the Mn content is preferably 0.15% by mass, and the upper limit of the Mn content is preferably 1.2% by mass.

(d) Ni: 0.1-2% by Mass

Ni is effective as an auxiliary element for graphitization. For graphitization, it should be 0.1% or more by mass, preferably 0.2% or more by mass. In addition, with the cast inner layer fused to the outer layer, an inner surface of the outer layer is melted and mixed into the inner layer, so that the Ni content increases in the inner layer when the Ni content is higher in the outer layer than in the inner layer. Because the increased Ni content lowers a transformation temperature from an austenite phase at a high temperature to a pearlite phase predominant at room temperature, axial cracking is likely to occur in the outer layer being cooled after casting. Accordingly, the upper limit of Ni should be 2% by mass, and is preferably 1.8% by mass.

(e) Cr: Less than 0.7% by Mass

Cr is combined with C to form cementite, improving the wear resistance. However, too much Cr deteriorates the mechanical properties of the inner layer. Specifically, 0.7% or more by mass of Cr deteriorates the mechanical properties of the inner layer. The upper limit of the Cr content is preferably 0.5% by mass. Incidentally, the lower limit of the Cr content may be 0.05% by mass. Also, because Cr in the outer layer is mixed into the integrally fused inner layer, the amount of Cr entering from the outer layer should be taken into consideration. As a result, the Cr content in the inner layer melt should be set such that the Cr content in the integrally fused inner layer is less than 0.7% by mass. The upper limit of the Cr content is preferably 0.5% by mass.

(f) Mo: Less than 0.7% by Mass

Because Mo is a carbide-forming element hindering graphitization, its amount should be limited. Mo entering from the outer layer (its melted inner surface) into the inner layer by their integral fusion is contained in MC carbides, or forms $M_2C$ carbides. The present invention is characterized by intentionally transferring Mo in the form of MC carbides from the outer layer into the inner layer, such that MC carbides enter the inner layer without remelting, improving the wear resistance of the inner layer. Therefore, the lower limit of the Mo content is preferably 0.05% by mass. On the other hand, 0.7% or more by mass of Mo extremely hinders graphitization, deteriorating the toughness of the inner layer. The upper limit of the Mo content is preferably 0.5% by mass.

(g) V: 0.05-1% by Mass

Because V is a strong carbide-forming element hindering graphitization, its amount should be limited. Most of V entering from the outer layer (its melted inner surface) into the inner layer by their integral fusion is in the form of MC carbides. The present invention is characterized by intentionally transferring MC carbides from the outer layer into the inner layer, such that MC carbides enter the inner layer without remelting, improving the wear resistance of the inner layer while suppressing the graphitization-hindering function of V. To secure sufficient wear resistance of the inner layer, V should be 0.05% or more by mass. However, more than 1% by mass of V hinders graphitization too much. The lower limit of the V content is preferably 0.1% by mass, and the upper limit of the V content is preferably 0.7% by mass, further preferably 0.5% by mass.

(h) Mg: 0.01-0.1% by Mass

Mg efficiently makes graphite spheroidal. Spheroidization drastically improves the toughness of the inner layer. For spheroidization, Mg should be 0.01% or more by mass, and sufficient at 0.1% or less by mass. The lower limit of the Mg content is preferably 0.015% by mass, and the upper limit of the Mg content is preferably 0.05% by mass.

(2) Optional Elements (a) Nb: Less than 0.5% by Mass

Because Nb is a strong carbide-forming element hindering graphitization like V, its amount should be limited. When Nb is contained in the outer layer, most of Nb entering from the outer layer (its melted inner surface) into the inner layer by their integral fusion is in the form of MC carbides. More than 0.5% by mass of Nb hinders graphitization too much. The upper limit of the Nb content is preferably 0.4% by mass. The Nb content is preferably 0.02% or more by mass, because the MC carbides improve the wear resistance of the inner layer.

(b) W: Less than 0.7% by Mass

W is a carbide-forming element hindering the graphitization of the inner layer. When W is contained in the outer layer, W in the outer layer (its melted inner surface) inevitably enters the inner layer integrally fused to the outer layer. To suppress the hindering of graphitization, W should be less than 0.7% by mass. The upper limit of the W content is preferably 0.6% by mass.

(3) Inevitable Impurities

The balance of the composition of the inner layer are substantially Fe and inevitable impurities. Among the inevitable impurities, P, S and N are preferably as little as possible because they deteriorate the mechanical properties. Specifically, P is preferably 0.1% or less by mass, S is preferably 0.05% or less by mass, and N is preferably 0.07% or less by mass. Also, B is preferably less than 0.05% by mass because it hinders the graphitization of the inner layer. When elements such as Zr, Co, Ti, Al, Ba, Cu, Sb, Te, Ce, rare earth metal elements, etc. are contained as other inevitable impurities in the outer layer, the total amount of these elements is preferably 0.7% or less by mass.

(4) Structure

The inner layer of the rolling composite roll of the present invention is made of graphite cast iron in which graphite is crystallized. Graphite cast iron softer than white cast iron containing no graphite exhibits high toughness. The graphite cast iron is classified by the shape (spheroidal, flaky, granular, etc.) of graphite. Particularly, spheroidal graphite cast iron in which spheroidal graphite is crystallized is preferable for the inner layer of the roll because of large toughness.

The area ratio of graphite in the graphite cast iron is preferably 2-12%. When the area ratio of graphite is less than 2%, the amount of cementite is too large, resulting in insufficient elongation, likely causing the breakage of the roll by a thermal or mechanical load during rolling. Because the upper limit of carbon is 3.6% by mass, the upper limit of the area ratio of graphite is 12%.

The composite roll of the present invention is characterized in that at least one shaft portion of the inner layer contains 200/cm$^2$ or more of hard MC carbides having circle-equivalent diameters of 5 µm or more. The hard MC carbides are V-based MC carbides containing Mo, etc. (MC carbides based on V and/or Nb when containing Nb and W, and containing Mo, W, etc.). Because hard MC carbides have higher hardness than that of alumina grinder particles, they remain in the form of projections on a flat surface of a test piece taken from the inner layer after successive grinding with diamond and alumina abrasive grains. Accordingly, the hard MC carbides can be observed by an optical microscope.

When a drive-side shaft portion 22 having a clutch portion 24 contains 200/cm$^2$ or more of hard MC carbides having circle-equivalent diameters of 5 µm or more, the clutch portion 24 can be protected from damage. The damage of the clutch portion 24 is mainly caused by wear by scratching with particles such as scales, etc. contained in grease during sliding with a coupling. Hard MC carbides having circle-equivalent diameters of 5 µm or less are easily detached together with an ambient structure, exhibiting a small effect of improving the wear resistance of the shaft portion. Larger numbers of hard MC carbides having circle-equivalent diameters of 5 µm or more are more advantageous for wear resistance, and they should be 200/cm$^2$ or more. The number of hard MC carbides having circle-equivalent diameters of 5 µm or more is preferably 300-5000/cm$^2$. More than 5000/cm$^2$ of hard MC carbides having circle-equivalent diameters of 5 µm or more make the inner layer too hard, failing to secure enough toughness. The upper limit of the circle-equivalent diameters of hard MC carbides is preferably 20 µm.

Because the other shaft portion, a free-side shaft portion 23 having no clutch portion 24, is integrally provided with a projection 25 necessary for handling, etc., without a portion sliding with the coupling, it is not required to have such wear resistance as required for the drive-side portion.

The number of hard MC carbides having circle-equivalent diameters of 5 µm or more in the other shaft portion is preferably 20-80% of that in one shaft portion. When the number of hard MC carbides having circle-equivalent diameters of 5 µm or more in the other shaft portion is 20% or more of that in one shaft portion, the other shaft portion has improved wear resistance. And when the number of hard MC carbides having circle-equivalent diameters of 5 µm or more in the other shaft portion is 80% or less of that in one shaft portion, the other shaft portion has improved machinability, resulting in low production cost. The number of hard MC carbides having circle-equivalent diameters of 5 µm or more in the other shaft portion is preferably 30% or more, more preferably 40% or more, of that in one shaft portion. The number of hard MC carbides having circle-equivalent diameters of 5 µm or more in the other shaft portion is preferably 70% or less, more preferably 60% or less, of that in one shaft portion.

Though the rolling composite roll of the present invention has been explained, an intermediate layer having an intermediate composition may be formed between the outer layer and the inner layer as a buffer layer for them.

[2] Production Method of Composite Roll for Rolling

Figure 3A:
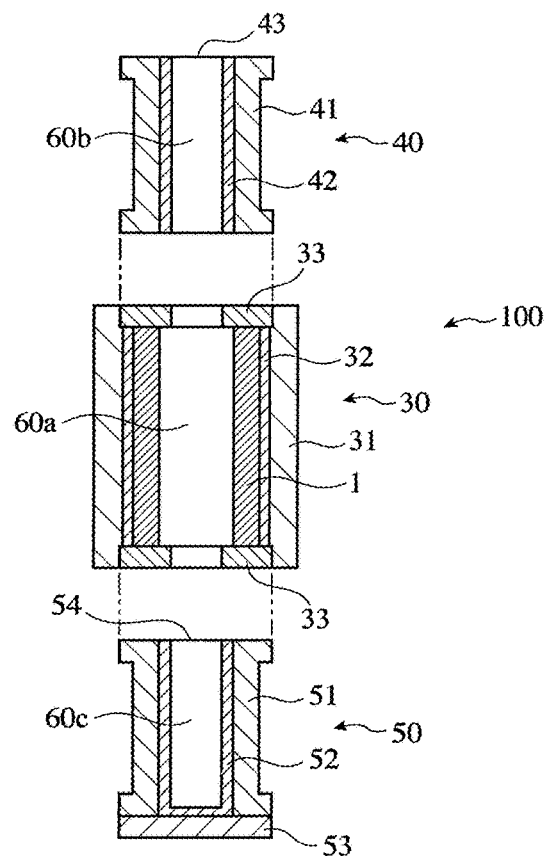
FIG. 3(a) is an exploded cross-sectional view showing an example of casting molds used for producing the rolling composite roll of the present invention.
Figure 3B:
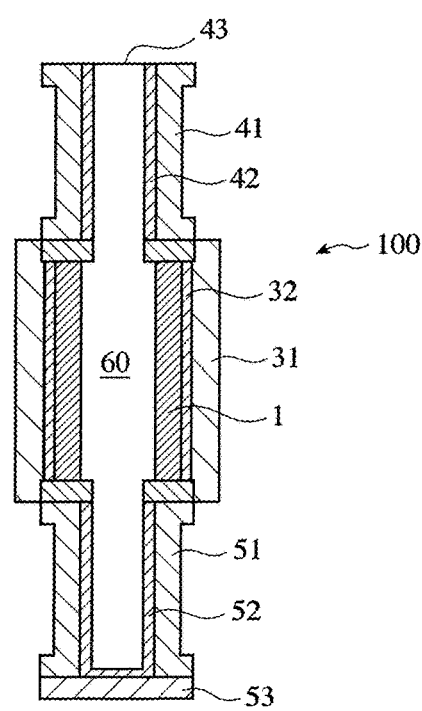
FIG. 3(b) is a cross-sectional view showing an example of casting molds used for producing the rolling composite roll of the present invention.

FIGS. 3(a) and 3(b) show an example of static casting molds used for casting the inner layer 2 after centrifugally casting the outer layer 1 in a cylindrical centrifugal-casting mold 30. This static casting mold 100 comprises a cylindrical casting mold 30 comprising the outer layer 1 on its inner surface, and upper and lower molds 40, 50 attached to upper and lower ends of the cylindrical casting mold 30. An inner surface of the outer layer 1 inside the cylindrical casting mold 30 has a cavity 60a for forming a core portion 21 of the inner layer 2, the upper mold 40 has a cavity 60b for forming a free-side shaft portion 23 of the inner layer 2, and the lower mold 50 has a cavity 60c for forming a drive-side shaft portion 22 of the inner layer 2. The cylindrical casting mold 30 for conducting a centrifugal casting method may be horizontal, inclined or vertical.

When a melt for the outer layer 1 poured into the rotating cylindrical centrifugal-casting mold 30 is centrifugally cast, a flux comprising oxide based on Si, etc. is preferably added to form a flux layer having a thickness of 0.5-30 mm on the inner surface of the outer layer, thereby preventing the oxidation of the inner surface of the solidified outer layer.

As shown in FIGS. 3(a) and 3(b), the cylindrical casting mold 30 comprising the centrifugally cast outer layer 1 is vertically placed on the lower mold 50 for forming the drive-side shaft portion 22, and the upper mold 40 for forming the free-side shaft portion 23 is placed on the cylindrical casting mold 30, to assemble the static casting mold 100 for forming the inner layer 2, with the cavity 60a inside the outer layer 1 communicating with the cavity 60b of the upper mold 40 and the cavity 60c of the lower mold 50 to constitute a cavity 60 for integrally forming the entire inner layer 1. There are sand molds 32 and 33 inside the cylindrical casting mold 30, and sand molds 42, 52 inside the upper and lower molds 40, 50. Incidentally, the lower mold 50 is provided with a bottom plate 53 for holding the inner layer melt.

After confirming that the inner surface temperature of the outer layer (surface temperature of the flux layer) inside the static casting mold 100 is in a range of 950° C. or higher and lower than 1000° C., an inner layer melt at 1330-1400° C. is poured into the cavity 60 through an upper opening 43 of the upper mold 40. While a surface of the melt in the cavity 60 is gradually elevated from the lower mold 50 to the upper mold 40, the flux layer is removed, so that the inner layer 2 constituted by the drive-side shaft portion 22, the core portion 21 and the free-side shaft portion 23 is integrally fused to the outer layer 1. The composition of the inner layer melt preferably comprises by mass 2.5-3.6% of C, 1.7-3.3% of Si, 0.1-1.5% of Mn, 0.1-2% of Ni, 0-0.5% of Cr, 0-0.5% of Mo, and 0.01-0.1% of Mg, the balance being substantially Fe and inevitable impurities. Incidentally, the inner layer melt may contain about 0-0.1% by mass of V, which comes from a raw material such as scraps, etc. as an inevitable impurity. Other inevitable impurities include P, S, N, B, Zr, Co, Ti, Al, Ba, Cu, Sb, Te, Ce, rare earth metal elements, etc.

The inner surface of the outer layer 1 is remelted to thickness of 10-30 mm by the heat of the cast inner layer melt. With the inner surface of the outer layer 1 remelted, Cr, Mo and V (further Cr, Mo, V, Nb and W when contained) in the outer layer 1 are mixed into the inner layer 2. Incidentally, the number of hard MC carbides having circle-equivalent diameters of 5 µm or more is larger in the drive-side shaft portion 22 formed in the lower mold 50 than in the free-side shaft portion 23 formed in the upper mold 40. As a result, the number of hard MC carbides having circle-equivalent diameters of 5 µm or more at least in the drive-side shaft portion 22 is 200/cm² or more. Why the drive-side shaft portion 22 contains more hard MC carbides than in the free-side shaft portion 23 is presumably due to the fact that the convection of the inner layer melt differs between the lower mold 50 and the upper molds 40.

When the inner surface temperature of the outer layer is lower than 950° C., the inner surface (up to the depth of 10-30 mm) of the outer layer is not sufficiently remelted even if the inner layer melt at 1330-1400° C. is poured, resulting in insufficient mixing of hard MC carbides from the outer layer into the inner layer. As a result, defects tend to be generated in their boundary, and at least one shaft portion cannot have 200/cm² or more of hard MC carbides having circle-equivalent diameters of 5 µm or more. To have sufficient hard MC carbides, the lower limit of the inner surface temperature of the outer layer is preferably 960° C. from the same point of view. When the inner surface temperature of the outer layer is 1000° C. or higher, the inner surface of the outer layer is melted too much when the inner layer melt is cast, hindering the graphitization of the inner layer. From the same point of view, the upper limit of the inner surface temperature of the outer layer is preferably 990° C.

When the casting temperature of the inner layer melt is lower than 1330° C., the inner surface of the outer layer cannot be sufficiently remelted even if the inner surface temperature of the outer layer is 950° C. or higher and lower than 1000° C., resulting in insufficient mixing of hard MC carbides from the outer layer into the inner layer. As a result, at least one shaft portion cannot have 200/cm² or more of hard MC carbides having circle-equivalent diameters of 5 µm or more. From the same point of view, the casting temperature of the inner layer melt is preferably 1340° C. or higher, further preferably 1350° C. or higher. Also, when the inner layer melt higher than 1400° C. is cast, hard MC carbides in the outer layer disappear in the inner layer melt while the inner surface of the outer layer is remelted. As a result, at least one shaft portion cannot have 200/cm² or more of hard MC carbides having circle-equivalent diameters of 5 µm or more. From the same point of view, the casting temperature of the inner layer melt is preferably 1390° C. or lower, further preferably 1380° C. or lower.

An intermediate layer may be formed by centrifugal casting on an inner surface of the centrifugally cast outer layer, as a buffer layer for the inner layer. Though the inner surface of the outer layer is remelted by the cast intermediate layer, MC carbides contained in the outer layer are not remelted but remain in the intermediate layer, because a small amount of an intermediate layer melt is not enough to remelt the inner layer. Particularly MC carbides having small specific gravity are concentrated in the inner surface of the intermediate layer by a centrifugal force. With the inner surface temperature of the intermediate layer set at the inner surface temperature of the outer layer according to the conditions of the present invention, the inner layer can be cast such that the inner surface of the intermediate layer is remelted, thereby mixing MC carbides from the intermediate layer into the inner layer.

The present invention will be explained in further detail by Examples below, without intention of restricting the present invention thereto.

Examples 1-6 and Comparative Examples 1-4

With a cylindrical casting mold 30 (inner diameter: 800 mm, and length: 2500 mm) having the structure shown in FIG. 3(a) set in a horizontal centrifugal-casting apparatus, a melt having a composition providing that of the outer layer (the balance: Fe and inevitable impurities) shown in Table 3 was centrifugally cast as an outer layer 1. A Si-based oxide flux was added during centrifugal casting, to form a flux layer as thick as 5 mm on the inner surface of the outer layer. Thereafter, the cylindrical casting mold 30 comprising the outer layer 1 (thickness: 90 mm) formed on its inner surface and the flux layer (thickness: 5 mm) formed on the inner surface of the outer layer 1 was erected and vertically attached to a hollow lower mold 50 (inner diameter: 600 mm, and length: 1500 mm) for forming a drive-side shaft portion 22. A hollow upper mold 40 (inner diameter: 600 mm, and length: 2000 mm) for forming a free-side shaft portion 23 was vertically attached to the cylindrical casting mold 30, to constitute a static casting mold 100 shown in FIG. 3(b).

After the inner surface temperature of the outer layer 1 (surface temperature of the flux layer) measured by an radiation thermometer was judged to reach the temperature shown in Table 2, a ductile cast iron melt having the composition (the balance: Fe and inevitable impurities) shown in Table 1 was poured at the temperature shown in Table 2 into the cavity 60 of the static casting mold 100 through its upper opening 43. With a surface of the ductile cast iron melt elevated successively from the lower mold 50 for forming the drive-side shaft portion 22 to the cylindrical casting mold 30 (outer layer 1) for forming the core portion 21, and then to the upper mold 40 for forming the free-side shaft portion 23, the flux was removed, and part of the inner surface of the outer layer was melted by the heat of the inner layer melt, thereby forming an integral inner layer 2 having the drive-side shaft portion 22, the core portion 21 and the free-side shaft portion 23 in the outer layer 1.

TABLE 1

| | Composition of Melt for Inner Layer (% by mass) | | | | | | | | | | |
|---|---|---|---|---|---|---|---|---|---|---|---|
| No. | C | Si | Mn | Ni | Cr | Mo | V | Nb | W | Mg | B |
| Example 1 | 3.30 | 2.61 | 0.50 | 1.22 | 0.05 | 0.03 | 0.02 | — | — | 0.038 | — |
| Example 2 | 3.31 | 2.63 | 0.49 | 1.25 | 0.05 | 0.03 | 0.02 | — | — | 0.041 | — |
| Example 3 | 3.3 | 2.66 | 0.48 | 1.22 | 0.06 | 0.02 | 0.01 | — | — | 0.045 | — |
| Example 4 | 3.26 | 2.59 | 0.52 | 1.24 | 0.05 | 0.02 | 0.01 | — | — | 0.041 | — |
| Example 5 | 3.28 | 2.60 | 0.50 | 1.25 | 0.05 | 0.03 | 0.01 | — | — | 0.042 | — |
| Example 6 | 3.31 | 2.56 | 0.49 | 1.20 | 0.05 | 0.03 | 0.02 | — | — | 0.039 | — |
| Com. Ex. 1 | 3.27 | 2.6 | 0.51 | 1.26 | 0.05 | 0.02 | 0.01 | — | — | 0.043 | — |
| Com. Ex. 2 | 3.3 | 2.59 | 0.5 | 1.25 | 0.05 | 0.02 | 0.01 | — | — | 0.044 | — |
| Com. Ex. 3 | 3.29 | 2.62 | 0.5 | 1.24 | 0.05 | 0.02 | 0.01 | — | — | 0.046 | — |
| Com. Ex. 4 | 3.28 | 2.61 | 0.5 | 1.25 | 0.05 | 0.02 | 0.01 | — | — | 0.044 | — |

| | Composition of Melt for Inner Layer (% by mass) | | | | |
|---|---|---|---|---|---|
| No. | N | S | Ti | Al | Fe[(1)] |
| Example 1 | 0.003 | 0.01 | — | 0.01 | Bal. |
| Example 2 | 0.003 | 0.01 | — | 0.01 | Bal. |
| Example 3 | 0.003 | 0.01 | — | 0.01 | Bal. |
| Example 4 | 0.003 | 0.01 | — | 0.01 | Bal. |
| Example 5 | 0.003 | 0.01 | — | 0.01 | Bal. |
| Example 6 | 0.003 | 0.01 | — | 0.01 | Bal. |
| Com. Ex. 1 | 0.003 | 0.01 | — | 0.01 | Bal. |
| Com. Ex. 2 | 0.003 | 0.01 | — | 0.01 | Bal. |
| Com. Ex. 3 | 0.003 | 0.01 | — | 0.01 | Bal. |
| Com. Ex. 4 | 0.003 | 0.01 | — | 0.01 | Bal. |

Note:
[(1)]The balance includes inevitable impurities.

After the complete solidification of the inner layer 2, the static casting mold 100 was disassembled to take out a composite roll, which was then tempered at 500° C. Thereafter, the outer layer 1, the drive-side shaft portion 22 and the free-side shaft portion 23 were machined to predetermined shapes to form a clutch portion 24 and a projection 25. The compositions (the balance: Fe and inevitable impurities) of the outer layer 1 and the inner layer 2 in each composite roll thus obtained are shown in Table 3. The composition of the inner layer 2 was analyzed in the drive-side shaft portion 22.

TABLE 2

| No. | Temperature of Inner Surface of Outer Layer (° C.) | Casting Temperature of Melt for Inner Layer (° C.) |
|---|---|---|
| Example 1 | 955 | 1342 |
| Example 2 | 957 | 1340 |
| Example 3 | 993 | 1396 |
| Example 4 | 980 | 1380 |
| Example 5 | 975 | 1382 |
| Example 6 | 980 | 1355 |
| Com. Ex. 1 | 735 | 1410 |
| Com. Ex. 2 | 1067 | 1465 |
| Com. Ex. 3 | 900 | 1498 |
| Com. Ex. 4 | 905 | 1315 |

TABLE 3

| | | Compositions of Outer And Inner Layers of Composite Roll (% by mass) | | | | | | | | | | |
|---|---|---|---|---|---|---|---|---|---|---|---|---|
| No. | | C | Si | Mn | Ni | Cr | Mo | V | Nb | W | Mg | B |
| Example 1 | Outer Layer | 1.86 | 0.85 | 0.74 | 2.45 | 4.88 | 6.33 | 5.41 | — | — | — | 0.084 |
| | Inner Layer | 3.25 | 2.55 | 0.45 | 1.28 | 0.30 | 0.27 | 0.30 | — | — | 0.021 | — |
| Example 2 | Outer Layer | 1.91 | 0.85 | 0.74 | 2.45 | 4.88 | 6.33 | 5.41 | 0.34 | 0.10 | — | 0.084 |
| | Inner Layer | 3.25 | 2.58 | 0.49 | 1.29 | 0.28 | 0.31 | 0.27 | 0.04 | 0.01 | 0.022 | — |
| Example 3 | Outer Layer | 1.93 | 0.84 | 0.74 | 2.42 | 4.89 | 6.31 | 5.43 | 0.33 | 0.12 | — | 0.081 |
| | Inner Layer | 3.17 | 2.52 | 0.53 | 1.3 | 0.53 | 0.65 | 0.56 | 0.05 | 0.01 | 0.021 | — |
| Example 4 | Outer Layer | 1.88 | 0.86 | 0.75 | 2.43 | 4.88 | 6.30 | 5.47 | 0.29 | 0.12 | — | 0.077 |
| | Inner Layer | 3.15 | 2.45 | 0.54 | 1.33 | 0.45 | 0.54 | 0.5 | 0.04 | 0.01 | 0.026 | — |

TABLE 3-continued

| | | | | | | | | | | | | |
|---|---|---|---|---|---|---|---|---|---|---|---|---|
| Example 5 | Outer Layer | 1.87 | 0.85 | 0.74 | 2.40 | 4.90 | 6.29 | 5.46 | 0.35 | 0.11 | — | 0.080 |
| | Inner Layer | 3.15 | 2.42 | 0.50 | 1.35 | 0.45 | 0.42 | 0.51 | 0.04 | 0.01 | 0.024 | — |
| Example 6 | Outer Layer | 1.84 | 0.85 | 0.77 | 2.41 | 4.99 | 6.35 | 5.55 | 0.34 | 0.10 | — | 0.080 |
| | Inner Layer | 3.15 | 2.42 | 0.50 | 1.35 | 0.45 | 0.42 | 0.51 | 0.04 | 0.01 | 0.024 | — |
| Com. Ex. 1 | Outer Layer | 1.90 | 0.86 | 0.76 | 2.43 | 4.87 | 6.31 | 5.44 | 0.32 | 0.09 | — | 0.082 |
| | Inner Layer | 3.2 | 2.52 | 0.52 | 1.32 | 0.33 | 0.36 | 0.35 | 0.03 | 0.01 | 0.023 | — |
| Com. Ex. 2 | Outer Layer | 1.87 | 0.86 | 0.76 | 2.42 | 4.85 | 6.28 | 5.42 | 0.33 | 0.11 | — | 0.079 |
| | Inner Layer | 3.12 | 2.36 | 0.54 | 1.39 | 0.61 | 0.75 | 0.67 | 0.04 | 0.01 | 0.021 | — |
| Com. Ex. 3 | Outer Layer | 1.89 | 0.86 | 0.75 | 2.43 | 4.91 | 6.35 | 5.51 | 0.36 | 0.09 | — | 0.077 |
| | Inner Layer | 3.1 | 2.45 | 0.54 | 1.4 | 0.62 | 0.75 | 0.67 | 0.04 | 0.01 | 0.019 | — |
| Com. Ex. 4 | Outer Layer | 1.86 | 0.85 | 0.77 | 2.42 | 4.85 | 6.30 | 5.42 | 0.35 | 0.13 | — | 0.083 |
| | Inner Layer | 3.26 | 2.58 | 0.5 | 1.27 | 0.17 | 0.18 | 0.02 | 0.04 | 0.01 | 0.02 | — |

| | | Compositions of Outer and Inner Layers of Composite Roll (% by mass) | | | | |
|---|---|---|---|---|---|---|
| No. | | N | S | Ti | Al | Fe[(1)] |
| Example 1 | Outer Layer | 0.05 | 0.01 | — | — | Bal. |
| | Inner Layer | 0.003 | 0.01 | — | 0.01 | Bal. |
| Example 2 | Outer Layer | 0.05 | 0.01 | — | — | Bal. |
| | Inner Layer | 0.003 | 0.01 | — | 0.01 | Bal. |
| Example 3 | Outer Layer | 0.06 | 0.01 | — | — | Bal. |
| | Inner Layer | 0.003 | 0.01 | — | 0.01 | Bal. |
| Example 4 | Outer Layer | 0.04 | 0.1 | — | — | Bal. |
| | Inner Layer | 0.003 | 0.015 | — | 0.01 | Bal. |
| Example 5 | Outer Layer | 0.05 | 0.01 | 0.03 | — | Bal. |
| | Inner Layer | 0.003 | 0.01 | 0.001 | 0.01 | Bal. |
| Example 6 | Outer Layer | 0.05 | 0.01 | — | 0.03 | Bal. |
| | Inner Layer | 0.003 | 0.01 | — | 0.01 | Bal. |
| Com. Ex. 1 | Outer Layer | 0.05 | 0.01 | — | — | Bal. |
| | Inner Layer | 0.003 | 0.01 | — | 0.01 | Bal. |
| Com. Ex. 2 | Outer Layer | 0.05 | 0.01 | — | — | Bal. |
| | Inner Layer | 0.003 | 0.01 | — | 0.01 | Bal. |
| Com. Ex. 3 | Outer Layer | 0.05 | 0.01 | — | — | Bal. |
| | Inner Layer | 0.003 | 0.01 | — | 0.01 | Bal. |
| Com. Ex. 4 | Outer Layer | 0.05 | 0.01 | — | — | Bal. |
| | Inner Layer | 0.003 | 0.01 | — | 0.01 | Bal. |

Note:
[(1)] The balance includes inevitable impurities.

Figure 4:
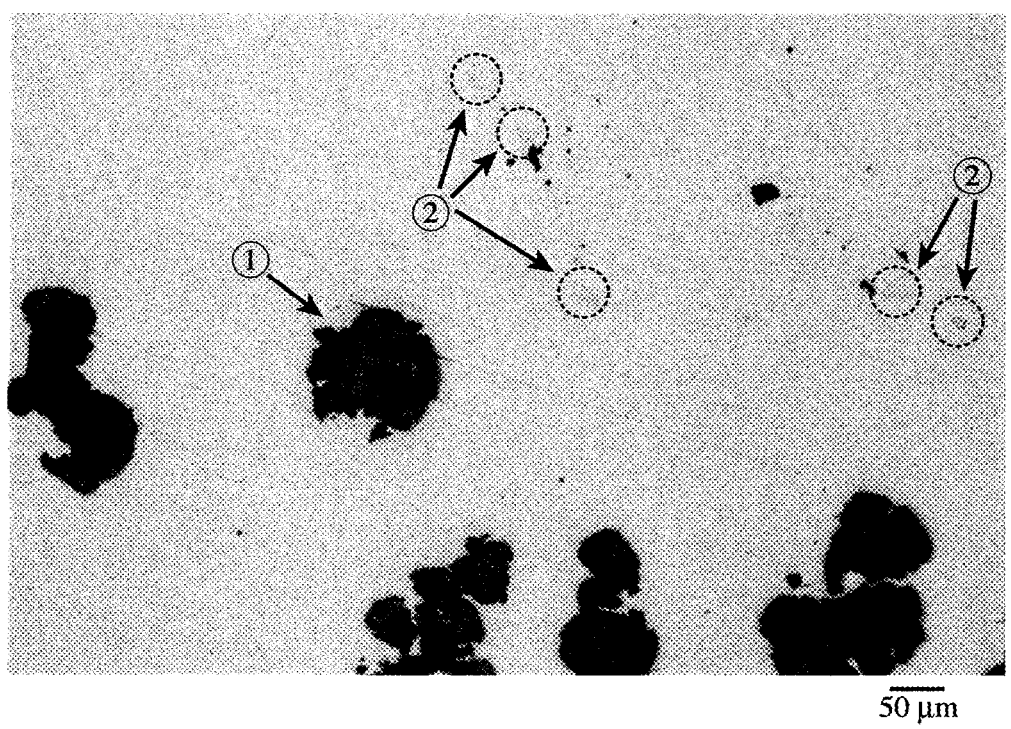
FIG. 4 is an optical photomicrograph of an unetched cross section of the shaft portion of the rolling composite roll of Example 3, which was ground by alumina abrasive grains.

After successively ground with diamond and alumina abrasive grains, optical photomicrographs (magnification: 200 times) of both shaft portions 22, 23 of the inner layer 2 of each composite roll were taken in an unetched state, to count the number of hard MC carbides having circle-equivalent diameters of 5 μm or more. FIG. 4 is an optical photomicrograph of a shaft portion of the rolling composite roll of Example 3. In FIG. 4, black portions shown by a circle 1 are graphite, and gray portions encircled by broken lines shown by circles 2 are hard MC carbides having a circle-equivalent diameter of 5 μm or more. The number of hard MC carbides having circle-equivalent diameters of 5 μm or more was counted in 10 arbitrary fields (each 660 μm×989 μm), averaged, and converted to the number per 1 cm².

Further, the remelted inner surface thickness of the outer layer 1, and fusion in a boundary between the outer layer 1 and the inner layer 2 were observed by ultrasonic inspection. The remelted inner surface thickness of the outer layer 1 was calculated by subtracting the thickness of the outer layer measured by ultrasonic inspection from the thickness (90 mm) of the outer layer before casting the inner layer. The number of hard MC carbides having circle-equivalent diameters of 5 μm or more in both shaft portions 22, 23, the remelted depth of the outer layer 1, and fusion in a boundary between the outer layer 1 and the inner layer 2 are shown in Table 4.

TABLE 4

| No. | Thickness of Remelted Inner Surface of Outer Layer (mm) | Hard MC Carbides [1] Drive-Side Shaft Portion | Hard MC Carbides [1] Free-Side Shaft Portion | Boundary between Outer Layer and Inner Layer |
|---|---|---|---|---|
| Example 1 | 12 | 326 | 171 | Good |
| Example 2 | 17 | 450 | 342 | Good |
| Example 3 | 28 | 761 | 559 | Good |
| Example 4 | 20 | 481 | 357 | Good |
| Example 5 | 22 | 528 | 388 | Good |
| Example 6 | 21 | 512 | 373 | Good |
| Com. Ex. 1 | 8 | 186 | 124 | Defective |
| Com. Ex. 2 | 40 | 171 | 78 | Defective |
| Com. Ex. 3 | 43 | 124 | 47 | Good |
| Com. Ex. 4 | 5 | 109 | 31 | Good |

Note:
[1] The number of hard MC carbides having circle-equivalent diameters of 5 μm or more (unit: /cm²).

In Examples 1-6, the inner surface temperature of the outer layer (surface temperature of the flux) before casting the inner layer melt was in a range of 950° C. or higher and lower than 1000° C., and the casting temperature of the inner layer melt was in a range of 1330-1400° C. As a result, the remelted inner surface thickness of the outer layer integrally fused to the inner layer was in a range of 10-30 mm, indicating sound fusion of the outer layer to the inner layer without defects in their boundary. Also, at least one (clutch portion) of the drive-side shaft portion and the free-side shaft portion of the inner layer contained 200/cm² or more of hard MC carbides having circle-equivalent diameters of 5 μm or more, exhibiting excellent wear resistance, and thus improved durability.

In Comparative Example 1, the inner surface temperature of the outer layer was as too low as 735° C., and the casting temperature of the inner layer melt was as too high as 1410° C. As a result, the remelted inner surface thickness of the outer layer was small with defects in a boundary between the outer layer and the inner layer, and the number of hard MC carbides having circle-equivalent diameters of 5 μm or more was less than 200/cm² in both shaft portions.

In Comparative Example 2, the inner surface temperature of the outer layer was as too high as 1067° C., and the casting temperature of the inner layer melt was also as too high as 1465° C. As a result, the remelted inner surface thickness of the outer layer was as too large as 40 mm, and the flux came off from the inner surface, resulting in defects in a boundary between the outer layer and the inner layer. Also, because the casting temperature of the inner layer melt was too high, hard MC carbides disappeared, so that the number of hard MC carbides having circle-equivalent diameters of 5 μm or more was less than 200/cm² in both shaft portions.

In Comparative Example 3, the inner surface temperature of the outer layer was as too low as 900° C., and the casting temperature of the inner layer melt was as too high as 1498° C. As a result, hard MC carbides disappeared despite a good boundary between the outer layer and the inner layer, and the number of hard MC carbides having circle-equivalent diameters of 5 μm or more was less than 200/cm² in both shaft portions.

In Comparative Example 4, the inner surface temperature of the outer layer was as too low as 905° C., and the casting temperature of the inner layer melt was also as too low as 1315° C. As a result, the remelted inner surface thickness of the outer layer was as too small as 5 mm, and the number of hard MC carbides mixed into the inner layer by the remelted inner surface of the outer layer was too small.

What is claimed is:

1. A composite roll for rolling comprising an outer layer and an inner layer integrally fused to each other;
    said outer layer being made of an Fe-based alloy comprising by mass 1-3% of C, 0.3-3% of Si, 0.1-3% of Mn, 0.1-5% of Ni, 1-7% of Cr, 1-8% of Mo, 4-7% of V, 0.005-0.15% of N, and 0.05-0.2% of B, the balance being substantially Fe and inevitable impurities;
    said inner layer being made of graphite cast iron comprising by mass 2.4-3.6% of C, 1.5-3.5% of Si, 0.1-2% of Mn, 0.1-2% of Ni, less than 0.7% of Cr, less than 0.7% of Mo, 0.05-1% of V, and 0.01-0.1% of Mg, the balance being substantially Fe and inevitable impurities; and
    said inner layer comprising a core portion fused to said outer layer, and shaft portions integrally extending from both ends of said core portion, at least one of said shaft portions containing 200/cm² or more of hard MC carbides having circle-equivalent diameters of 5 μm or more.

2. The composite roll for rolling according to claim 1, wherein said outer layer further contains 0.1-3% by mass of Nb, and said inner layer contains less than 0.5% by mass of Nb.

3. The composite roll for rolling according to claim 1, wherein said outer layer further contains 0.1-5% by mass of W, and said inner layer contains less than 0.7% by mass of W.

4. The composite roll for rolling according to claim 1, wherein said outer layer further contains 0.3% or less by mass of S.

5. The composite roll for rolling according to claim 1, wherein said outer layer further contains at least one selected from the group consisting of 0.1-10% of Co, 0.01-0.5% of Zr, 0.005-0.5% of Ti, and 0.001-0.5% of Al by mass.

6. A method for producing the rolling composite roll recited in claim 1, comprising
    (1) centrifugally casting said outer layer in a rotating, cylindrical centrifugal-casting mold; and then
    (2) pouring a melt for said inner layer at 1330-1400° C. into a cavity of said outer layer while the inner surface temperature of said outer layer is 950° C. or higher and lower than 1000° C., to remelt the inner surface of said outer layer to the depth of 10-30 mm.

7. The method for producing a composite roll for rolling according to claim 6, wherein the inner surface temperature of said outer layer was 960-990° C. when the melt for said inner layer was poured.

8. The method for producing a composite roll for rolling according to claim 6, wherein the melt for said inner layer has a composition comprising by mass 2.5-3.6% of C, 1.7-3.3% of Si, 0.1-1.5% of Mn, 0.1-2% of Ni, 0-0.5% of Cr, 0-0.5% of Mo, and 0.01-0.1% of Mg, the balance being substantially Fe and inevitable impurities.

* * * * *